US011343436B2

(12) United States Patent
Wang et al.

(10) Patent No.: US 11,343,436 B2
(45) Date of Patent: May 24, 2022

(54) HALF-SHIELD PHASE DETECTION AUTO-FOCUS SENSOR FOR AUTO-EXPOSURE CONVERGENCE

(71) Applicant: Advanced Micro Devices, Inc., Santa Clara, CA (US)

(72) Inventors: Po-Min Wang, Hsinchu (TW); Yung-Chiu Liu, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,378

(22) Filed: Sep. 25, 2020

(65) Prior Publication Data

US 2021/0409587 A1    Dec. 30, 2021

Related U.S. Application Data

(60) Provisional application No. 63/044,621, filed on Jun. 26, 2020.

(51) Int. Cl.
*H04N 5/235*  (2006.01)
*H04N 5/369*  (2011.01)
*H04N 5/232*  (2006.01)

(52) U.S. Cl.
CPC ......... *H04N 5/2352* (2013.01); *H04N 5/2353* (2013.01); *H04N 5/23212* (2013.01); *H04N 5/36961* (2018.08)

(58) Field of Classification Search
CPC ............. H04N 5/2352; H04N 5/36961; H04N 5/2353; H04N 5/23212
See application file for complete search history.

(56) References Cited

U.S. PATENT DOCUMENTS

2018/0295269 A1* 10/2018 Sakaguchi ............. H04N 5/343
2019/0057495 A1*  2/2019 Shionoya ............... H04N 5/243
2019/0066271 A1*  2/2019 Kanbara ............... H04N 5/3535
2019/0182431 A1*  6/2019 Kikuchi ........... H04N 5/232122

OTHER PUBLICATIONS

Alizadeh, Peyman, "Object Distance Measurement Using a Single Camera for Robotic Applications", Thesis, Sep. 2, 2014, 126 pages.
(Continued)

*Primary Examiner* — Gevell V Selby
(74) *Attorney, Agent, or Firm* — Kowert Hood Munyon Rankin and Goetzel PC; Rory D. Rankin

(57) ABSTRACT

Systems, apparatuses, and methods for using a half-shield phase detection auto-focus (PDAF) sensor for auto-exposure convergence are disclosed. A camera includes at least one or more half-shield PDAF sensors and control logic for performing an automatic exposure control convergence procedure. The control logic receives half-pixel values from half-shield PDAF sensors for a first frame. The control logic calculates twice the value of each half-pixel value captured by the half-shield PDAF sensors for the first frame. Then, the control logic adjusts an exposure setting used for capturing a second frame based on how much twice the value of each sensor value is over the maximum pixel intensity value. This approach allows the automatic exposure control convergence procedure to converge more quickly than prior art procedures.

20 Claims, 11 Drawing Sheets

(56) References Cited

OTHER PUBLICATIONS

Jang et al., "Sensor-Based Auto-Focusing System Using Multi-Scale Feature Extraction and Phase Correlation Matching", Sensors, Mar. 2015, pp. 5747-5762, vol. 15, Issue 3.

Kok et al., "Using Inertial Sensors for Position and Orientation Estimation", Foundations and Trends in Signal Processing, 2017, 90 pages, vol. 11, No. 1-2, https://arxiv.org/pdf/1704.06053.pdf. [Retrieved Jun. 9, 2020].

Krishnan et al., "Estimation of Distance to Texture Surface Using Complex Log Mapping", Journal of Computer Applications, Jul.-Sep. 2010, pp. 16-21, vol. III, No. 3.

Murawski, Krzysztof, "Method of Measuring the Distance to an Object Based on One Shot Obtained from a Motionless Camera with a Fixed-Focus Lens", Acta Physica Polonica Series a (Acta Phys Pol A), Jun. 2015, pp. 1591-1595, vol. 127, No. 6.

Robisson et al., "Autofocus measurement for imaging devices", IS&T International Symposium on Electronic Imaging Science and Technology, Jan. 29, 2017, pp. 209-218, https://pdfs.semanticscholar.org/c47f/5578659b2e896744baae2c2c2460758c5610.pdf. [Retrieved Jun. 9, 2020].

Zaarane et al., "Distance measurement system for autonomous vehicles using stereo camera", Array, Mar. 2020, 7 pages, vol. 5, https://www.sciencedirect.com/science/article/pii/S2590005620300011?via%3Dihub. [Retrieved Jun. 24, 2020].

\* cited by examiner

HALF-SHIELD PHASE DETECTION AUTO-FOCUS SENSOR FOR AUTO-EXPOSURE CONVERGENCE

CROSS REFERENCE TO RELATED APPLICATIONS

This application claims priority to Provisional Patent Application Ser. No. 63/044,621, entitled "HALF-SHIELD PHASE DETECTION AUTO-FOCUS SENSOR FOR AUTO-EXPOSURE CONVERGENCE", filed Jun. 26, 2020, the entirety of which is incorporated herein by reference.

BACKGROUND

Description of the Related Art

When a camera is used in environments with different ambient light intensities, the ideal exposure time varies according to the ambient light intensity. For a bright light condition, a short exposure is used to avoid the resultant image being overexposed. For a low light condition, a long exposure is used to avoid a dark image. Most cameras include an automatic exposure control mechanism to automatically adjust the exposure settings based on the ambient light conditions. However, the time it takes for the automatic exposure control mechanism to converge can result in a negative user experience if the shot-to-shot time or start-to-shot time is too long. The shot-to-shot time refers to the time in between successive images captured by the camera, while the start-to-shot time refers to the time it takes for the camera to capture an image from when the user activates the camera (i.e., presses the shutter button).

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for using a half-shield phase detection auto-focus (PDAF) sensor to optimize auto-exposure convergence are disclosed herein. In one implementation, a camera includes a plurality of half-shield PDAF sensors used for performing an auto-focus routine. These half-shield PDAF sensors can also be used to reduce the auto-exposure convergence time by generating a more accurate over-exposure estimate. For example, if a first frame is over-exposed, one or more half-pixel values are retrieved from one or more half-shield PDAF sensors. The half-pixel values are doubled, and a representative doubled half-pixel value is calculated based on these values. In one implementation, the representative doubled half-pixel value is calculated as an average of the doubled half-pixel values. Next, the representative doubled half-pixel value is provided as an estimate of the over-exposure of the first frame to an auto-exposure control mechanism. The exposure setting is adjusted for a second frame, where the adjustment is determined based on the estimate of the over-exposure of the first frame. Through the use of these techniques, a relatively fast auto-exposure convergence time can be achieved. This helps to reduce the shot-to-shot time period as well as the start-to-shot time period.

Figure 1:
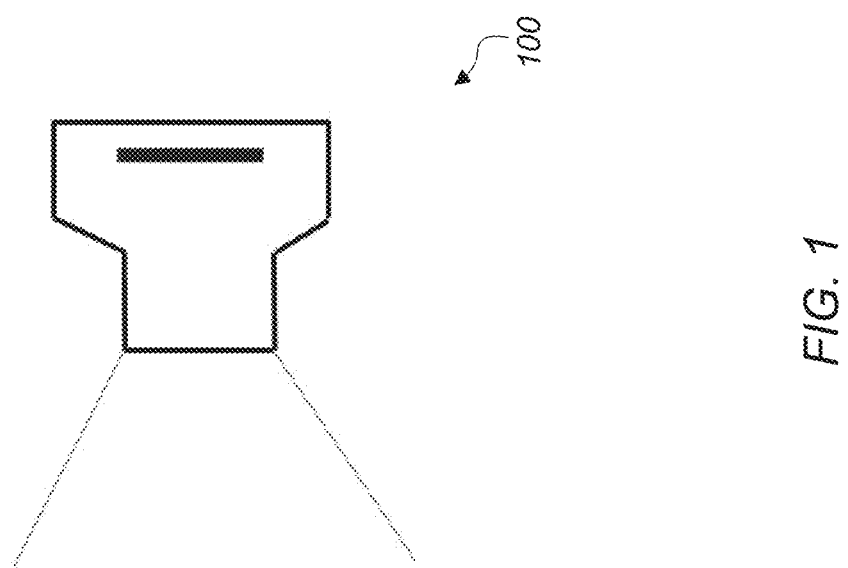
FIG. 1 is a block diagram of one implementation of a camera.

Referring now to FIG. 1, a diagram of one implementation of a camera 100 is shown. In one implementation, camera 100 includes half-shield phase detection auto-focus (PDAF) sensors for automatically adjusting the focus of camera 100. Additionally, in one implementation, camera 100 uses the half-shield PDAF sensors for automatically adjusting the exposure settings. Each half-shield PDAF sensor includes a half-shield which blocks half of the incident light. Thus, luminance captured by a half-shield PDAF sensor is half of what an ordinary pixel sensor would capture. If the luminance captured by half-shield PDAF sensor is doubled, this gives a close approximation of what an ordinary pixel sensor would register. For regions of an image which are over-saturated, the ordinary pixel sensors will be at the maximum pixel intensity value (e.g., 1023 for a 10-bit pixel value). In one implementation, to attain an estimate of how over-saturated the image is, the luminance captured by a half-shield PDAF sensor is doubled and then used as the estimate of over-saturation.

For example, if an image is over-exposed, camera 100 generates an estimate of the amount of over-exposure based on doubling the half-pixel value captured from a given half-shield PDAF sensor. In some cases, camera 100 calculates an average of the luminance of a plurality of half-shield PDAF sensor values. Then, camera 100 doubles the average and uses the doubled average as an estimate of the amount of over-exposure of the image. Next, camera 100 uses the estimate of over-exposure to determine how much to reduce the exposure settings for the next image. This approach allows an automatic exposure control convergence procedure to converge more quickly than a traditional procedure. Accordingly, implementations for using a half-shield pixel value to estimate an over-exposure level of an image are described in the remainder of this disclosure. It is noted that any type of system or device can implement the techniques described herein, including an integrated circuit (IC), processing unit, mobile device, computer, camera, wearable device, and other types of computing devices and systems. Also, while the descriptions herein often refer to images, it should be understood that these descriptions also apply to video frames captured by a video camera or other devices capable of capturing a sequence of images.

Figure 2:
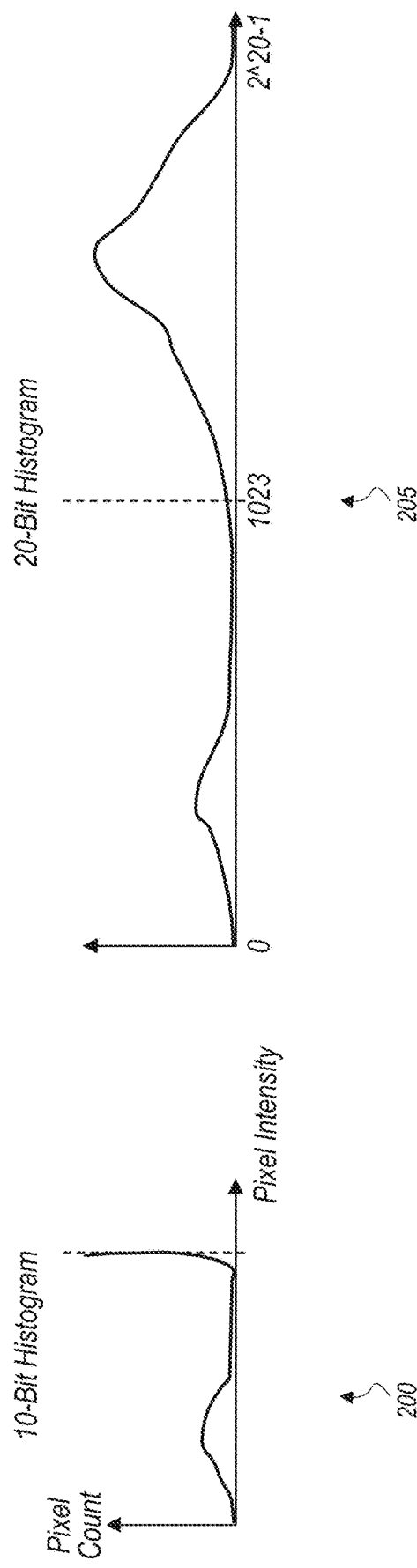
FIG. 2 includes diagrams of histograms of the pixel intensity values for a given image.

Turning now to FIG. 2, diagrams of histograms 200 and 205 for the pixel intensity values of a given image are shown. Histogram 200 shows the distribution of 10-bit pixel values of an over-exposed image. In some cases, histogram 200 can be provided as an input to an automatic exposure control convergence procedure to enable the procedure to determine how to adjust the exposure settings for capturing a subsequent image. As shown in histogram 200, a relatively large number of pixels are at the maximum pixel intensity value of 1023. This makes it difficult to determine how much the given image has been overexposed since the amount that the actual pixel intensity values are over the maximum value is unknown.

One way to address this issue is to use a larger number of bits per pixel. For example, histogram 205 on the right-side of FIG. 2 shows a histogram for the same image but using 20-bits per pixel rather than 10-bits per pixel. Accordingly, when 20-bit pixel values are used, the histogram is spread out throughout the full range of pixel values rather than having a large percentage of pixel values being saturated. However, doubling the number of bits used per pixel value increases the hardware cost and power consumption of the camera. Therefore, other solutions for processing over-exposed images are desired.

Figure 3:
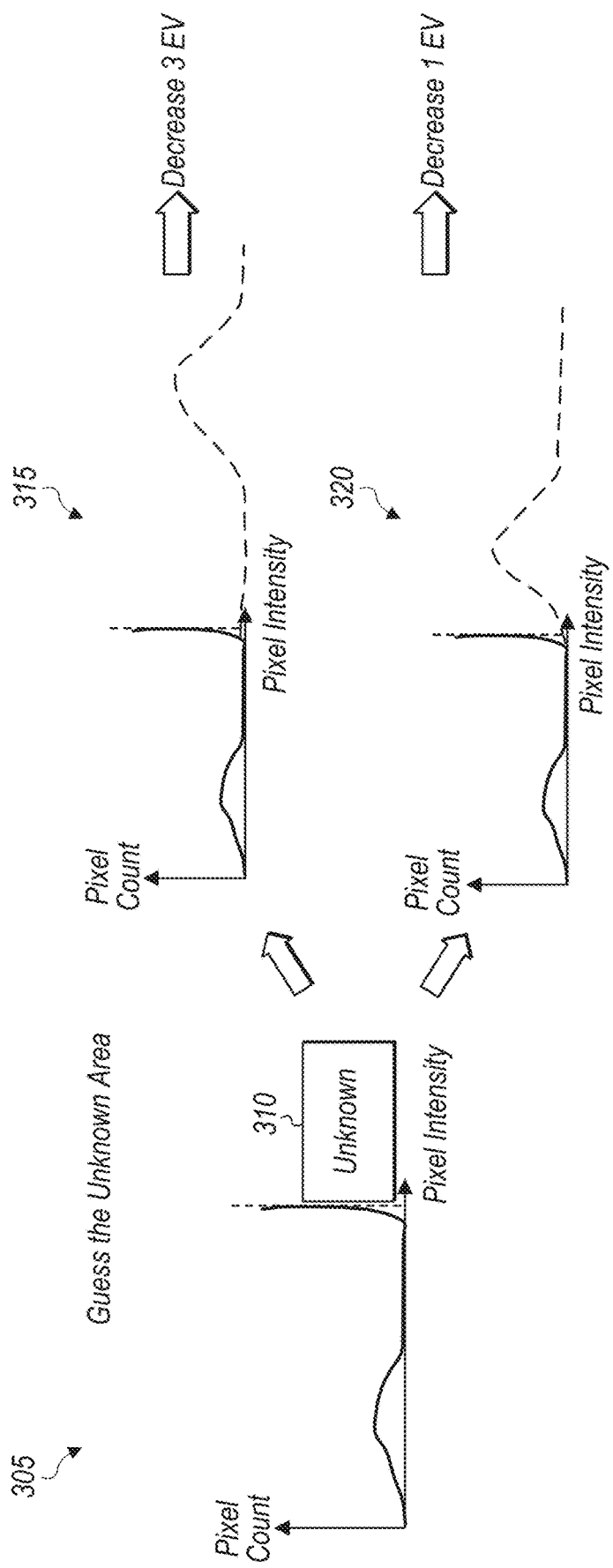
FIG. 3 illustrates one example of a histogram of an over-exposed image and corresponding exposure value corrections.

Referring now to FIG. 3, one example of a histogram 305 of an over-exposed image and corresponding exposure value corrections are shown. Histogram 305 represents one example of a histogram of pixel values for an over-exposed image. Since a relatively large percentage of pixels are at the maximum pixel intensity, the actual distribution of these saturated pixels is unknown. The saturated pixels are represented by unknown area 310 in histogram 305. When histogram 305 is provided to an automatic exposure control convergence procedure, the automatic exposure control convergence procedure will guess what the distribution of the saturated pixels is so as to make a corresponding adjustment to the exposure value (EV) applied to the next image.

As used herein, the term "exposure value" is defined as a parameter representing the degree of exposure. In other words, the "exposure value" is the amount of exposure applied to an image through the various exposure settings that are available for adjustment. Examples of exposure settings include shutter speed, International Organization for Standardisation (ISO) speed, aperture size, exposure time, and/or other parameters. As the exposure value is increased, the pixel intensity (i.e., luminance) of a corresponding captured image will increase. As the exposure value is decreased, the pixel intensity of a corresponding captured image will decrease. Adjusting the exposure value can involve adjusting any one or more of the exposure settings.

Histogram 315 shows the same pixel values for histogram 305 but with the dashed line to the right of the maximum pixel intensity value representing an estimate of the pixel distribution for the saturated pixels. This estimate assumes that the saturated pixels have values much higher than the maximum pixel intensity value. If the automatic exposure control convergence procedure assumes that the actual distribution looks like that shown for the dashed line of histogram 315, the automatic exposure control convergence procedure will decrease the exposure value by a relatively large amount (e.g., 3 EV). Histogram 320 shows another estimate of the pixel distribution for saturated pixels but with most of the pixels being only slightly more intense than the maximum pixel intensity value. If the automatic exposure control convergence procedure assumes that the actual distribution matches the dashed line of histogram 320, the automatic exposure control convergence procedure will decrease the exposure value by a relatively small amount (e.g., 1 EV).

When an automatic exposure control convergence procedure processes a pixel distribution with a relatively large number of saturated pixels, the automatic exposure control convergence procedure is unable to have a precise understanding of how these saturated pixels are distributed. This results in a slow convergence and an unacceptable delay for the end-user of the camera. Some automatic exposure control convergence procedures take an aggressive approach to exposure value correction in response to detecting an over-exposed image. This can result in an overshoot and a relatively darker image as the next image if the exposure value is decreased too much, especially if the real pixel distribution is similar to that shown in the dashed line of histogram 320. Other automatic exposure control convergence procedures take a conservative approach to exposure value correction in response to detecting an over-exposed image. The result of a conservative approach is often a slow convergence, especially for pixel distributions similar to that shown for the dashed line of histogram 315. Accordingly, it is desired to come up with improved techniques for estimating the over-exposure of images to help reduce the time needed for the automatic exposure control convergence procedure to converge.

Figure 4:
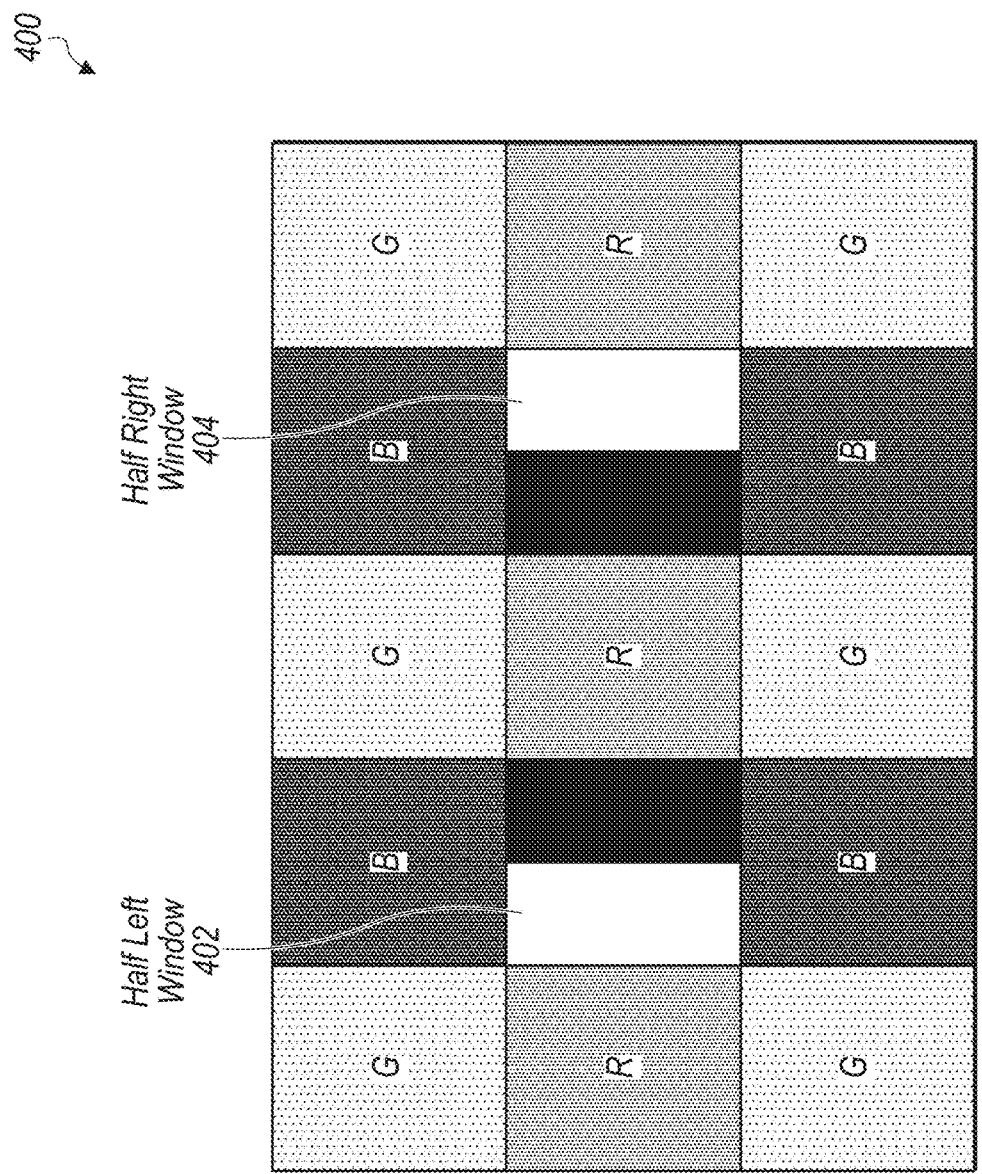
FIG. 4 is a block diagram of one implementation of a portion of an image pixel array for use in a camera.

Turning now to FIG. 4, a block diagram of one implementation of a portion of an image pixel array 400 for use in a camera is shown. The grid of pixels shown in FIG. 4 is a small cross-section of an image pixel array 400 that is included within any of various types of camera devices. The pattern shown in this grid can be repeated throughout the entirety of the overall image pixel array. As shown, a half-shield phase detection auto-focus (PDAF) pixel is shown in the left-center of array 400, with half-left window 402 open to allow in incident light. The right-half of this pixel is opaque to block any incident light from reaching the sensor underneath the pixel. Also, the half-shield PDAF pixel in the right-center of array 400 has a half-right window 404 open to allow in incident light. Any number of half-shield PDAF pixel pairs which are constructed similar to the half-shield PDAF pixel pair of half-left window 402 and half-right window 404 can be distributed throughout the overall image pixel array.

The other pixels of pixel array 400 are regular pixels arranged in a pattern of green, red, and blue pixels. Each green, red, and blue pixel is labeled with a G, R, and B, respectively. It should be understood that the pattern of regular pixels and half-shield PDAF pixels shown in pixel array 400 is merely indicative of one type of pattern that can be used in a given implementation. In other implementations, other patterns of regular pixels and half-shield PDAF pixels can be arranged within the pixel array.

Typically, the pixel values captured by half-shield PDAF pixels are used to implement an auto-focus control procedure. However, in one implementation, the half-shield PDAF pixels are also used to implement an auto-exposure convergence procedure. In this implementation, control logic receives the pixel values captured by the sensors underneath half-left window 402 and half-right window 404. The control logic generates a representative doubled half-pixel value based on the pixel values captured by the sensors underneath half-left window 402 and half-right window 404. The representative doubled half-pixel value is then provided to the automatic exposure control convergence procedure and used to determine how much to adjust the exposure value for the next image.

For example, in one implementation, the representative doubled half-pixel value is calculated as the sum of the pixel values captured by the sensors underneath half-left window 402 and half-right window 404. In another implementation, the representative doubled half-pixel value is calculated as twice the value of one of the pixel values captured by either the sensor underneath half-left window 402 or the sensor underneath half-right window 404. For example, in one implementation, the larger of the two pixel values is doubled and then used as the representative doubled half-pixel value. In other implementations, other techniques for generating the representative doubled half-pixel value can be utilized.

In one scenario, the pixels of pixel array 400 may capture values for an over-exposed image or for an over-exposed region of an image. The red, green, and blue pixels may all be at the maximum pixel intensity, such as 1023 for 10-bit values. In this scenario, the values captured by the sensors under half-left window 402 and half-right window 404 may be less than 1023. For example, in one implementation, these values may be 800. This would indicate that the actual pixel values of the red, green, and blue pixels are closer to 1600. If the approximation of 1600 is provided to the automatic exposure control convergence procedure, this would allow the automatic exposure control convergence procedure to make the proper adjustment to the exposure settings to accurately reduce the over-exposure. As a result, this would allow the automatic exposure control convergence procedure to converge more rapidly.

It is noted that the "half-shield pixel values" captured underneath half-left window 402 and half-right window 404 may not be exactly half of what a normal pixel value in that location would be even though these windows are half-shielded. The relationship between the actual half-shield pixel values captured underneath half-left window 402 and half-right window 404 and the normal pixel values that would be captured without any shielding depends on a specific type of image sensor manufacturing. While it is described in many cases that a half-shield pixel value will be doubled to approximate what a normal pixel value would be, it should be understood that this represents one possible implementation. In another implementation, a calibration procedure is performed to calculate the sensitivity difference between a half-shield pixel and a regular pixel. Depending on the type of image sensor being used, this sensitivity difference may be 1.9, 2.1, or some other value. This difference is then applied to generate a representative full-pixel value from one or more captured half-shield pixel values. Accordingly, it should be understood that the descriptions herein that recite "doubling a half-pixel value" are not limited to multiplying a half-shield pixel value by two, but can also cover other implementations where the sensitivity difference being applied is equal to some other value different from two. Also, "doubling a half-pixel value" can also cover adding two half-pixel values together and then optionally applying a correction factor to the sum of the two half-pixel values. This correction factor can be determined during a calibration process. Other techniques for generating a representative full-pixel value from one or more captured half-shield pixel values are possible and are contemplated. Additionally, it is noted that the terms "representative doubled half-pixel value" and "representative full-pixel value" can be used interchangeably herein.

Figure 5:
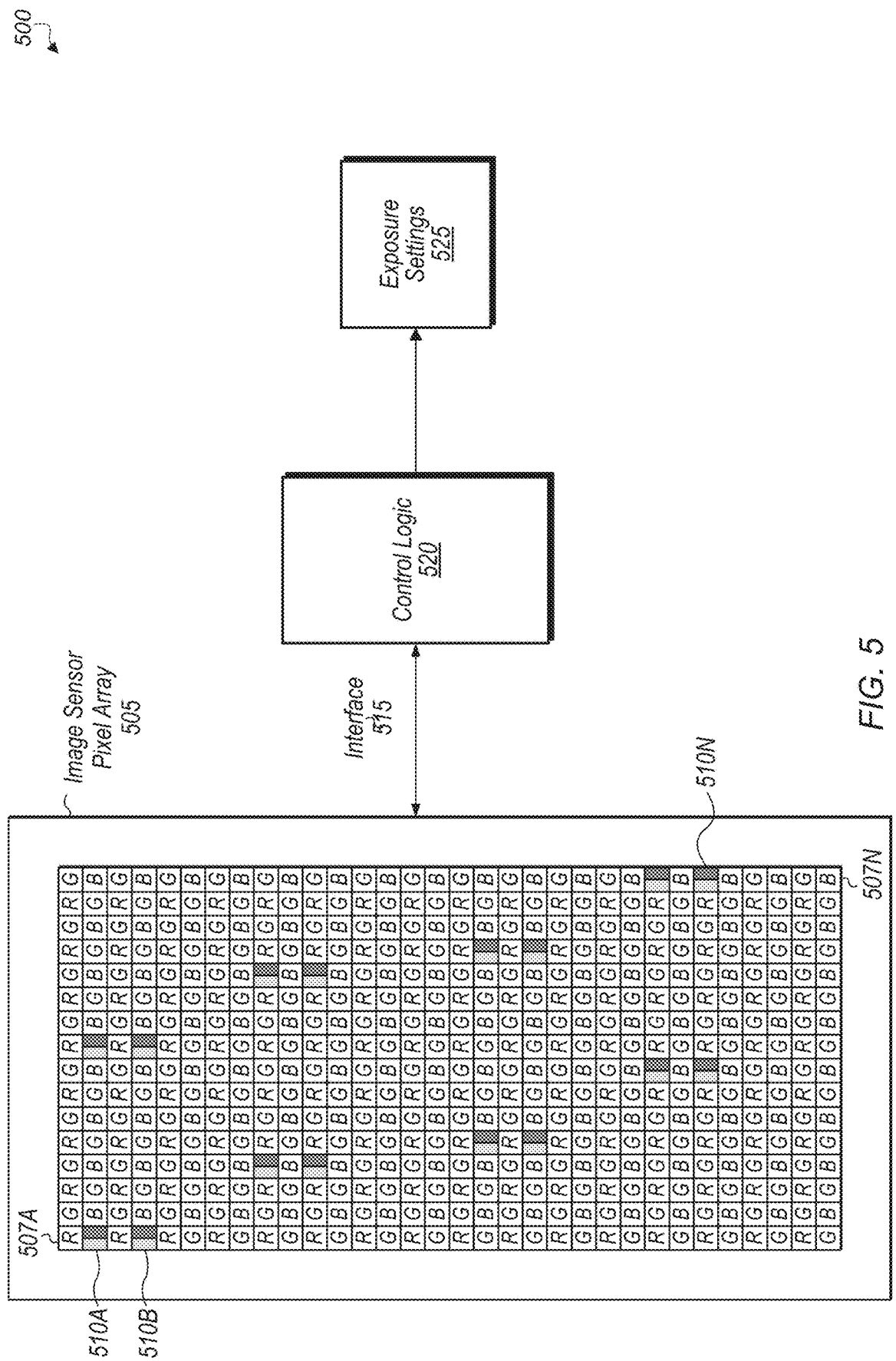
FIG. 5 is a block diagram of one implementation of an apparatus for use in a camera.

Referring now to FIG. 5, a block diagram of one implementation of an apparatus 500 for use in a camera is shown. In one implementation, apparatus 500 includes at least pixel array 505, interface 515, control logic 520, and exposure settings 525. Pixel array 505 includes regular pixels 507A-N and a plurality of half-shield phase detection auto-focus (PDAF) sensors 510A-N. It is noted that half-shield PDAF sensors 510A-N can also be referred to herein as half-shield PDAF pixel units 510A-N. Control logic 520 is coupled to pixel array 505 via interface 515. Interface 515 is representative of any type of interface for coupling the values of half-shield PDAF sensors 510A-N to control logic 520. It is noted that apparatus 500 can include any number of other components in addition to those shown in FIG. 5. In one implementation, apparatus 500 is located within camera 100 of FIG. 1. In other implementations, apparatus 500 is located within a smartphone, tablet, computer, security device, wearable device, or other types of systems or devices.

In one implementation, control logic 520 uses values from one or more of half-shield PDAF sensors 510A-N to generate an estimate of the over-exposure of a given image. For example, in one implementation, control logic 520 calculates a luminance value from the half-shield PDAF sensor 510A-N. In one implementation, the luminance value "Y" is calculated as Y=0.3*R+0.59*G+0.11*B, where R, G, and B are the red, green, and blue pixel half-shield PDAF sensor values, respectively. In another implementation, there is a clear color filter covering the unshielded half of the PDAF sensor, and the luminance value "Y" is set equal to the captured half-shield PDAF sensor value in this case. In a further implementation, there is a green color filter covering the unshielded half of the PDAF sensor, and the luminance value "Y" is equal to the captured half-shield PDAF green pixel value. Other implementations can use other suitable techniques for calculating the luminance value based on the value(s) captured by one or more half-shield PDAF sensor(s).

Then, control logic 520 doubles each luminance value and then calculates an average from the doubled values. In one implementation, control logic 520 selects half-shield PDAF sensors 510A-N from over-exposed areas of the given image for generating the average from the doubled values. The average of the doubled values is then used as the estimate of the over-exposure of the given image. Then, control logic 520 causes the exposure settings 525 applied to the next image to be adjusted to reduce the brightness of the next image based on the estimate of over-exposure. Exposure settings 525 include settings such as shutter speed, ISO speed, aperture size, exposure time, and/or other parameters.

In one implementation, the half-pixel values from the half-shield PDAF sensors are provided to an automatic focus procedure in parallel with being provided to the automatic exposure control convergence procedure. It is noted that depending on the implementation, the functions described as being performed by control logic 520 can be performed using any combination of hardware and/or software. For example, in another implementation, at least a portion of the functionality described as being performed by control logic 520 is performed by a processing unit executing program instructions.

Figure 6:
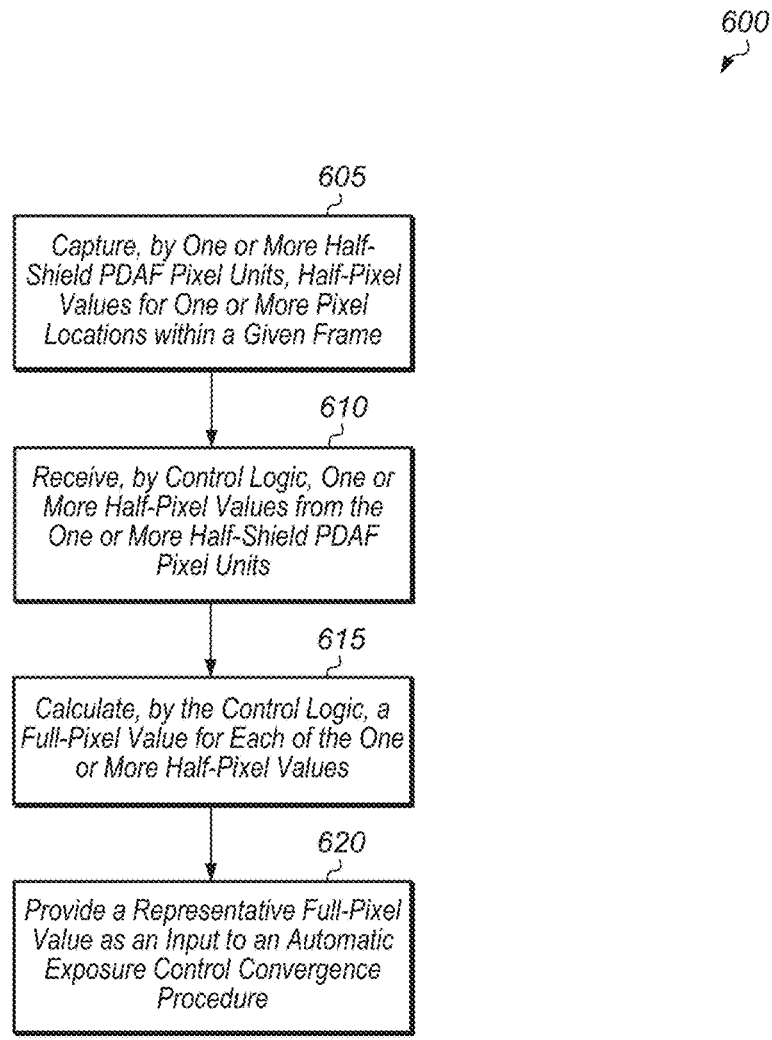
FIG. 6 is a generalized flow diagram illustrating one implementation of a method for reducing a convergence time of an automatic exposure loop.

Turning now to FIG. 6, one implementation of a method 600 for reducing a convergence time of an automatic exposure loop is shown. For purposes of discussion, the steps in this implementation and those of FIG. 7-10 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

One or more half-shield phase detection auto-focus (PDAF) pixel units capture half-pixel values for one or more pixel locations within a given frame (block 605). It is noted that the half-pixel values may not be precisely half of what a normal pixel value would be for an unshielded pixel at the same location. However, for the purposes of various discussion herein, the values captured under the half-shield pixel units will be referred to as "half-pixel" values. The half-pixel values might be some other fraction of a normal pixel value, and this fraction can be discovered during a calibration process in one implementation. In some implementations, the half-pixel values are considered to be half of a normal pixel value for approximation purposes until a calibration process is performed.

Control logic receives one or more half-pixel values from the one or more half-shield PDAF pixel units (block 610). The control logic calculates a full-pixel value for each of the one or more half-pixel values (block 615). Then, the control logic provides a representative full-pixel value as an input to an automatic exposure control convergence procedure (block 620). After block 620, method 600 ends. The automatic exposure control convergence procedure can then make accurate adjustments to the exposure settings based on the representative full-pixel value. In one implementation, a magnitude of the adjustment to the exposure setting is calculated based on the representative full-pixel value. For example, method 800 of FIG. 8 describes an example of adjusting the exposure settings in accordance with one implementation. Other techniques for adjusting the exposure setting based on the representative full-pixel value are possible and are contemplated.

Depending on the implementation, the representative full-pixel value can be calculated in different ways based on the one or more half-pixel values from the one or more half-shield PDAF pixel units. For example, in one implementation, the representative full-pixel value is calculated as an average of the luminance of the one or more doubled half-pixel values from the one or more half-shield PDAF pixel units. In some cases, the average is calculated from only those half-pixel values which were captured in over-saturated locations within the given frame. In another implementation, the representative full-pixel value is calculated as two (or some other factor which is determined during a calibration process) multiplied by the maximum half-pixel value of a plurality of half-pixel values from a plurality of half-shield PDAF pixel units.

Figure 7:
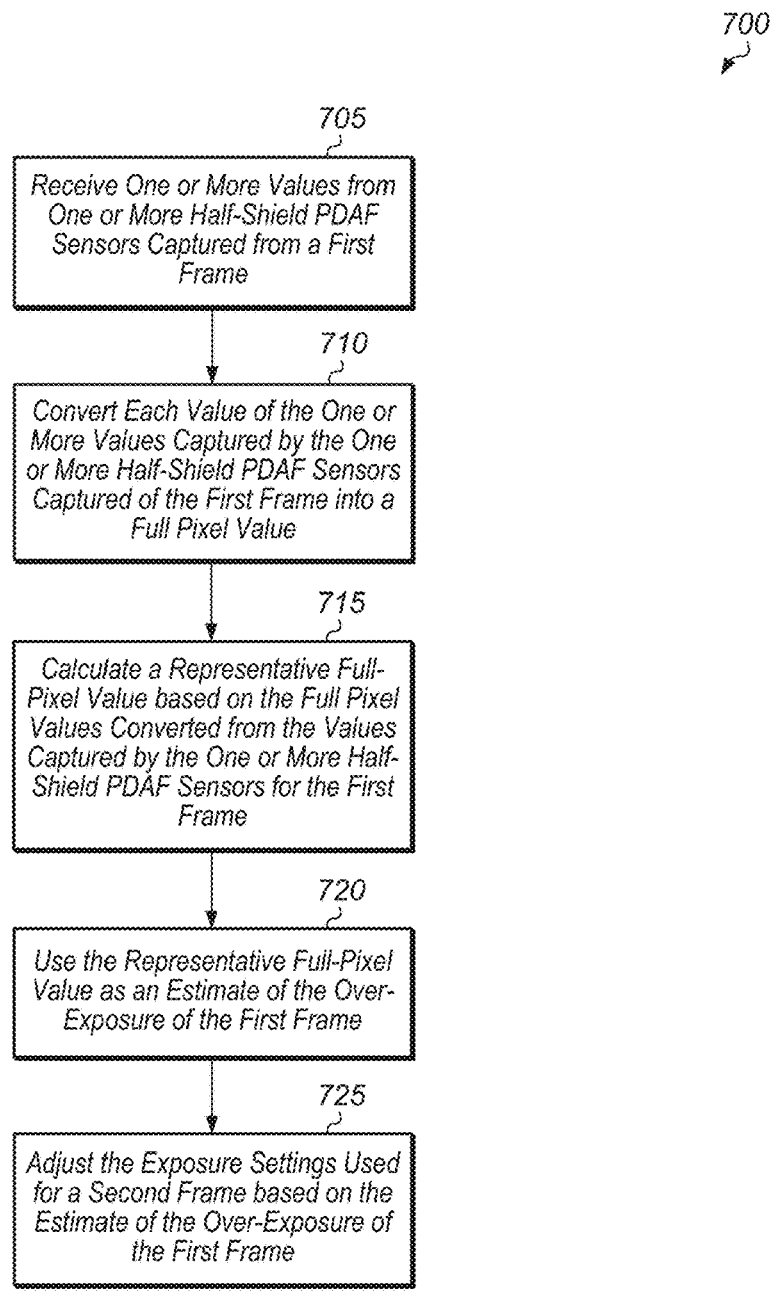
FIG. 7 is a generalized flow diagram illustrating one implementation of a method for increasing an accuracy of adjustments to an exposure value.

Referring now to FIG. 7, one implementation of a method 700 for increasing an accuracy of adjustments to an exposure value is shown. Control logic receives one or more values from the one or more half-shield PDAF sensors captured from a first frame (block 705). The control logic converts each value of the one or more values captured by the one or more half-shield PDAF sensors of a first frame into a full pixel value (block 710). Next, the control logic calculates a representative full-pixel value based on the full pixel values converted from the values captured by the one or more half-shield PDAF sensors for the first frame (block 715). In one implementation, the representative full-pixel value is calculated as an average of the luminance of the full-pixel values. In another implementation, the representative full-pixel value is calculated from a single half-pixel sensor that is located in an over-exposed area of the first frame. In a further implementation, the representative full-pixel value is calculated as an average of doubled half-pixel luminance values from multiple pixel locations from over-exposed areas of the first frame. In one implementation, the over-exposed areas of the first frame are identified as regions having greater than a threshold percentage of saturated pixel values.

Then, the control logic uses the representative full-pixel value as an estimate of the over-exposure of the first frame (block 720). Next, the control logic adjusts the exposure value used for a second frame based on the estimate of the over-exposure of the first frame (block 725). In one implementation, the control logic causes the exposure value to be reduced by an amount that is proportional to the estimate of the over-exposure of the first frame. After block 725, method 700 ends. It is noted that method 700 can be performed any number of times until the auto-exposure algorithm converges. However, using method 700 allows the auto-exposure algorithm to converge more quickly than the prior art auto-exposure algorithms.

Figure 8:
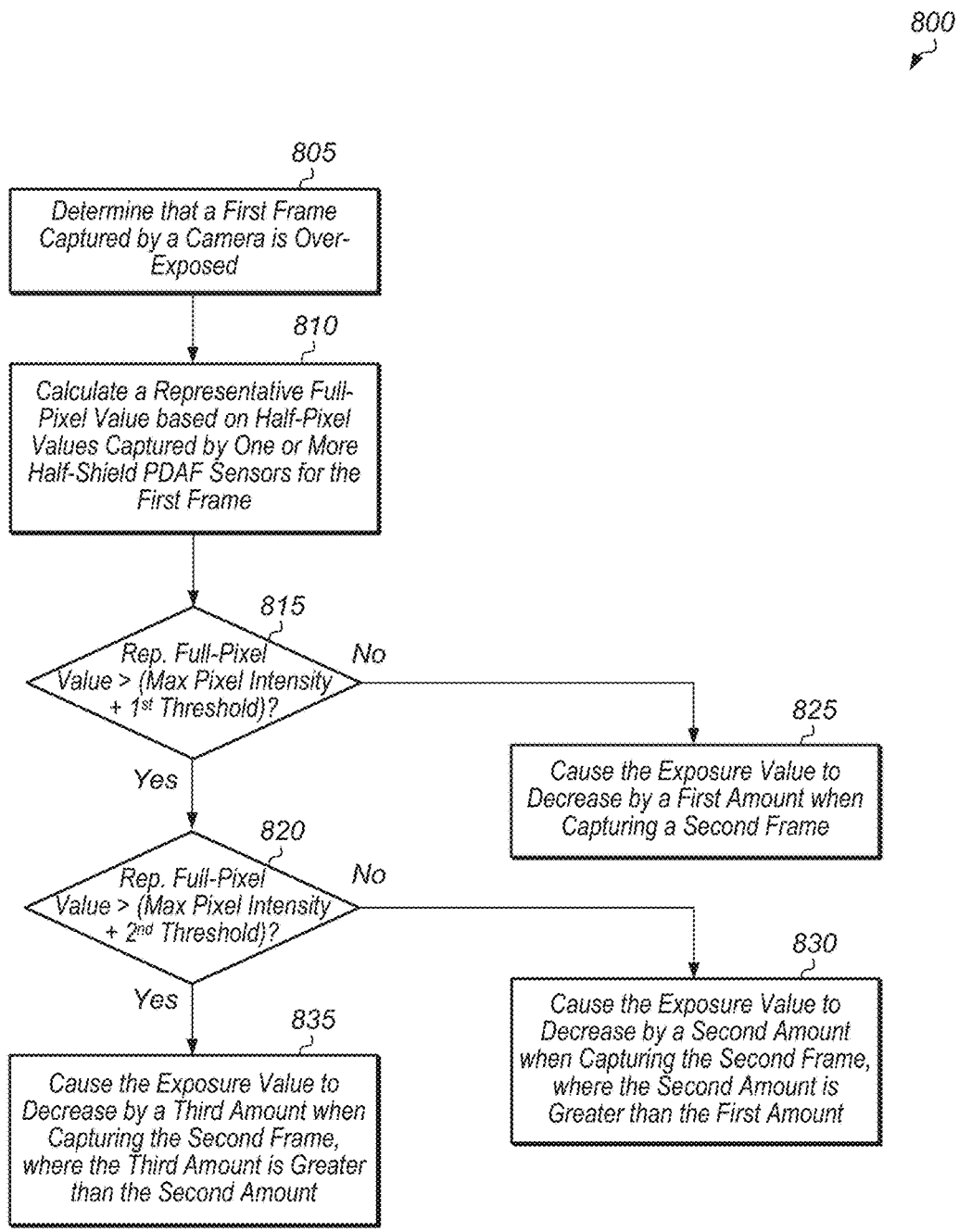
FIG. 8 is a generalized flow diagram illustrating one implementation of a method for using a half-shield phase detection auto-focus sensor for auto-exposure convergence.

Turning now to FIG. 8, one implementation of a method 800 for using a half-shield phase detection auto-focus sensor for auto-exposure convergence is shown. Control logic determines that a first frame captured by a camera is over-exposed (block 805). Any suitable technique for determining that the first frame is over-exposed can be employed, with the technique varying according to the implementation. For example, in one implementation, the control logic determines that the first frame is over-exposed if greater than a threshold percentage (e.g., 20%) of pixels of the first frame are saturated (i.e., at the maximum pixel intensity value). The threshold percentage can vary from implementation to implementation.

In response to determining that the first frame is over-exposed, the control logic calculates a representative full-pixel value based on half-pixel values captured by one or more half-shield phase detection auto-focus (PDAF) sensors for the first frame (block 810). For example, in one implementation, the control logic calculates the representative full-pixel value by taking the average of double the half-pixel values calculated from the one or more half-shield PDAF sensors. In other implementation, other suitable techniques for calculating the representative full-pixel value based on the pixel values from one or more half-shield PDAF sensors can be employed.

If the amount that the representative full-pixel value is greater than the maximum pixel intensity value is more than a first threshold (conditional block 815, "yes" leg), then the control logic determines if the representative full-pixel value is greater than the maximum pixel intensity value by more than a second threshold (conditional block 820). It is assumed for the purposes of this discussion that the second threshold is greater than the first threshold. If the amount that the representative full-pixel value is greater than the maximum pixel intensity value is less than the first threshold (conditional block 815, "no" leg), then the control logic causes the exposure value to decrease by a first amount when capturing a second frame (block 825). It is assumed for the purposes of this discussion that the second frame is captured subsequent to the first frame.

If the representative full-pixel value is greater than the maximum pixel intensity value by less than the second threshold (conditional block 820, "no" leg), then the control logic causes the exposure value to decrease by a second amount for capturing the second frame, where the second amount is greater than the first amount (block 830). If the representative full-pixel value is greater than the maximum pixel intensity value by more than the second threshold (conditional block 820, "yes" leg), then the control logic causes the exposure value to decrease by a third amount when capturing the second frame, where the third amount is greater than the second amount (block 835). After blocks 825, 830, and 835, method 800 ends. While method 800 describes using two threshold values for comparison purposes, it is noted that other implementations can have other numbers of thresholds for comparing to the representative full-pixel value. Increasing the number of thresholds allows the control logic to adjust the exposure value at a finer granularity.

Figure 9:
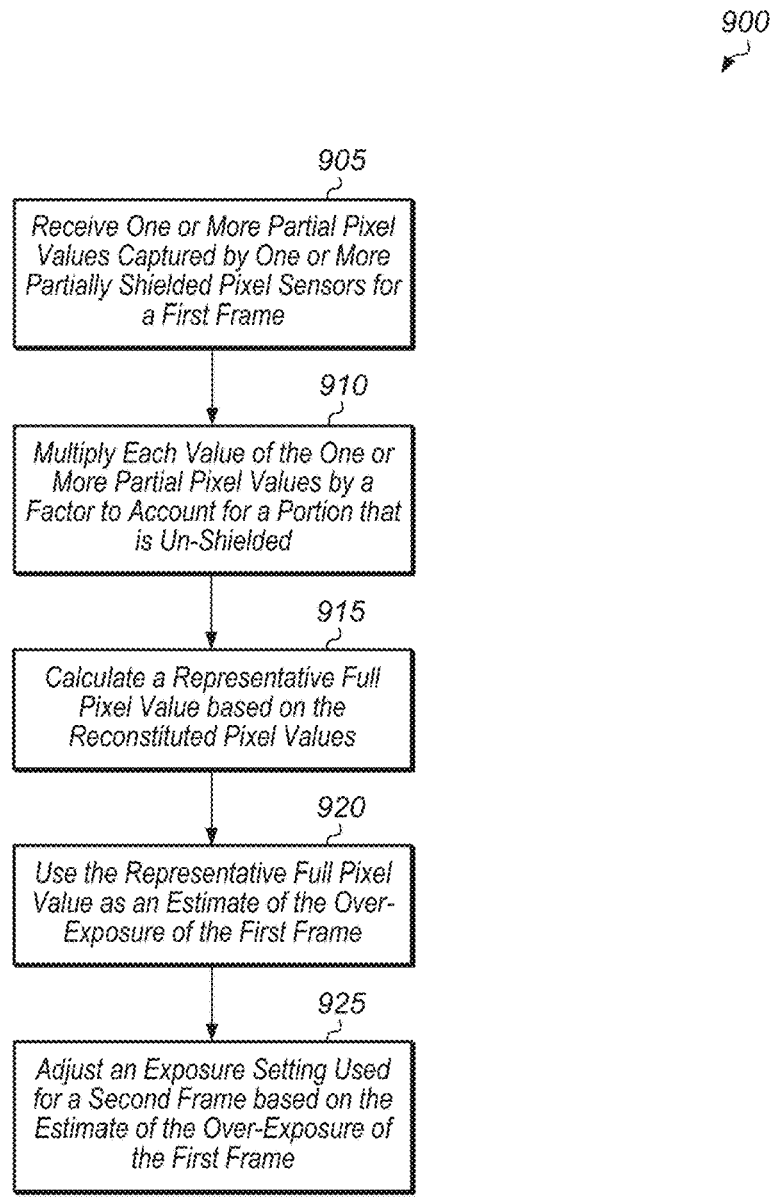
FIG. 9 is a generalized flow diagram illustrating one implementation of a method for using partially shielded sensors to help perform an auto-exposure loop.

Referring now to FIG. 9, one implementation of a method 900 for using partially shielded sensors to help perform an auto-exposure loop is shown. Control logic receives one or more partial pixel values from the one or more partially shielded PDAF sensors captured from a first frame (block 905). The partially shielded PDAF sensors can be 75% shielded, 87.5% shielded, 90% shielded, or other percentage amounts shielded with the amount varying from implementation to implementation.

The control logic multiplies each value of the one or more values from the one or more partial pixel values by a factor to account for a portion that is un-shielded (block 910). For example, if the sensor is ¼ un-shielded, then the control logic multiplies the corresponding partial pixel value by 4 or other value determined by a calibration process. Or, if the sensor is ⅛ un-shielded, then the control logic multiplies the corresponding partial pixel value by 8 or other value determined by a calibration process. It is noted that the term "factor" can also be referred to herein as a "sensitivity difference". Next, the control logic calculates a representative full pixel value based on the reconstituted pixel values (i.e., the one or more partial pixel values multiplied by corresponding factors) (block 915). In one implementation, the representative full pixel value is calculated as an average of the reconstituted pixel values.

Then, the control logic uses the representative full pixel value as an estimate of the over-exposure of the first frame (block 920). Next, the control logic adjusts an exposure value used for a second frame based on the estimate of the over-exposure of the first frame (block 925). After block 925, method 900 ends. It is noted that method 900 can be performed any number of times until the auto-exposure algorithm converges. It should be understood that while many of the examples provided in this disclosure describe the use of half-shield PDAF sensors, the scenarios depicted in these examples can also be implemented with partially-shielded PDAF sensors. When using partially-shielded PDAF sensors rather than half-shield PDAF sensors, appropriate adjustments can be made to the correction factors being applied to the captured partial-pixel values.

Figure 10:
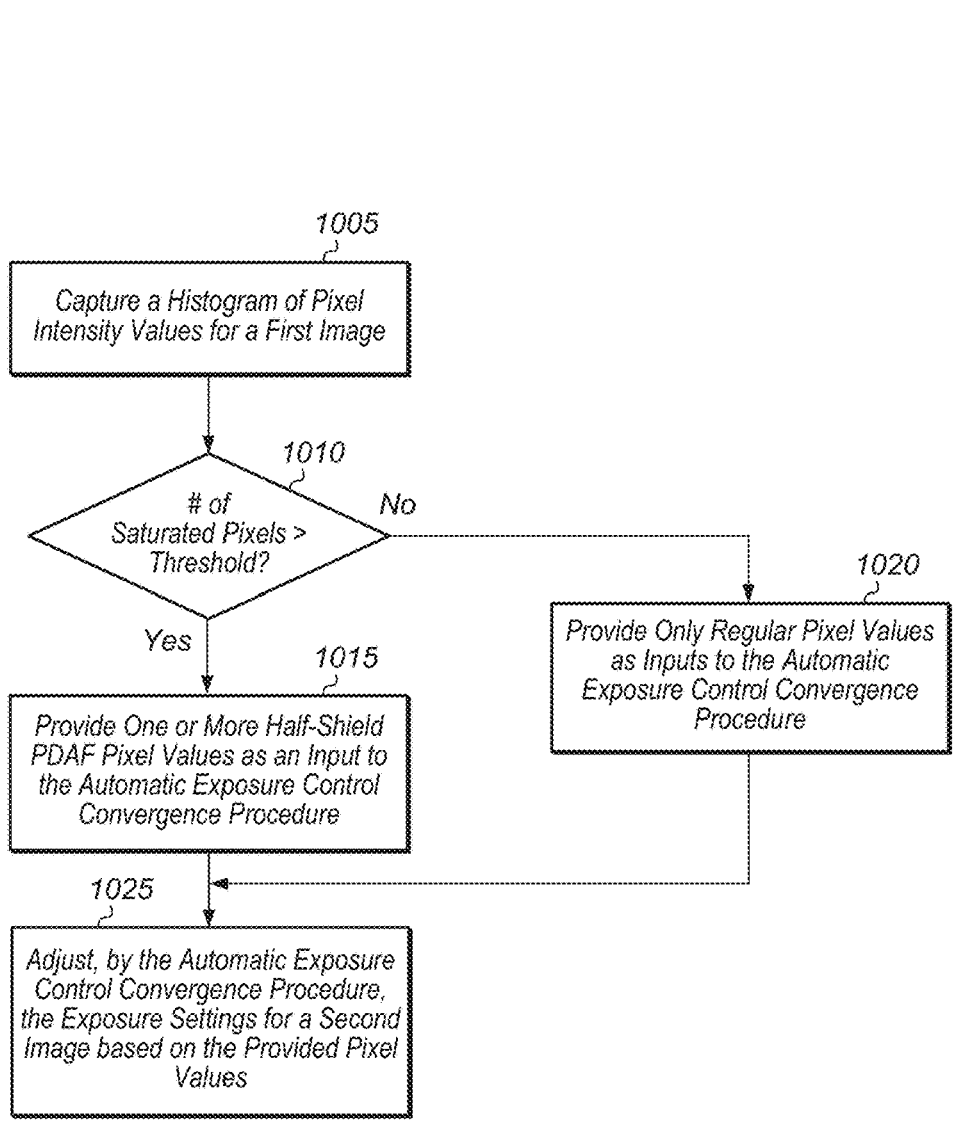
FIG. 10 is a generalized flow diagram illustrating one implementation of a method for performing an automatic exposure control convergence procedure.

Turning now to FIG. 10, one implementation of a method 1000 for performing an automatic exposure control convergence procedure is shown. A histogram of pixel intensity values are captured for a first image (block 1005). If greater than a threshold number of pixel intensity values are saturated (i.e., equal to the maximum pixel intensity value) (conditional block 1010, "yes" leg), then one or more half-shield PDAF pixel values are provided as an input to the automatic exposure control convergence procedure (block 1015). When providing half-shield PDAF pixel values to the automatic exposure control convergence procedure, these values are identified as being half-shield PDAF pixel values. For cases when the automatic exposure control convergence procedure also receives the regular pixel values for the over-exposed image, the automatic exposure control convergence procedure will be able to differentiate which values are generated by which sensor types to be able to make better adjustments to the exposure settings to achieve faster convergence.

If less than the threshold number of pixel intensity values are saturated (i.e., equal to the maximum pixel intensity value) (conditional block 1010, "no" leg), then only regular pixel values (i.e., not including any of the half-shield PDAF pixel values) are provided as an input to the automatic exposure control convergence procedure (block 1020). Next, the automatic exposure control convergence procedure adjusts the exposure settings for a second image based on the provided pixel values (block 1025). After block 1025, method 1000 ends.

Figure 11:
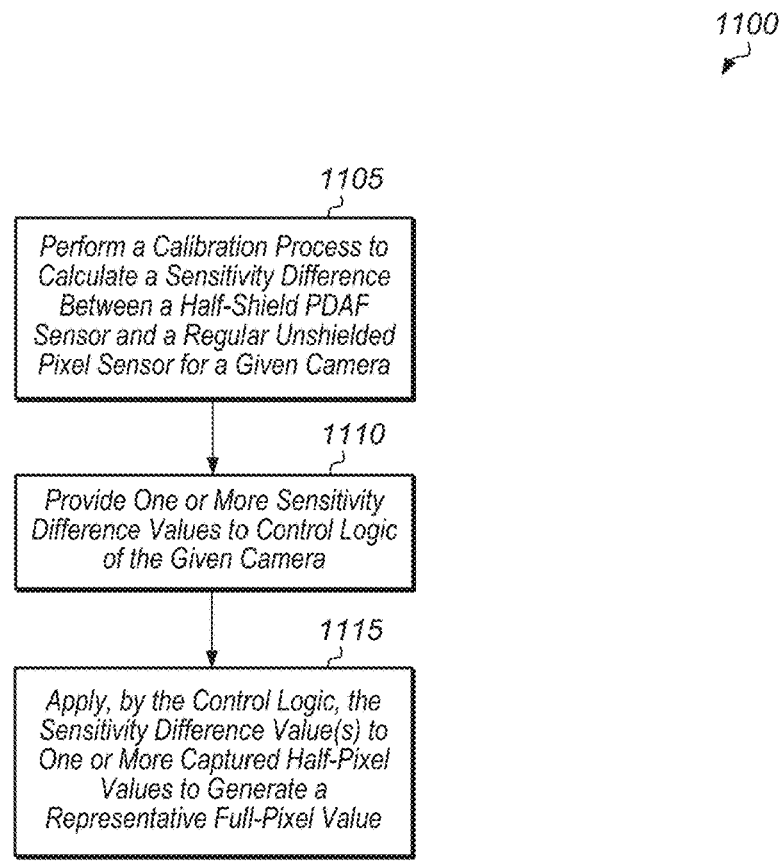
FIG. 11 is a generalized flow diagram illustrating one implementation of a method for generating a representative full-pixel value.

Referring now to FIG. 11, one implementation of a method 1100 for generating a representative full-pixel value is shown. A system or apparatus performs a calibration procedure to calculate a sensitivity difference between a half-shield PDAF sensor and a regular unshielded pixel sensor for a given camera (block 1105). The sensitivity difference specifies a difference between values captured by a half-shield PDAF sensor and values captured by a regular unshielded pixel sensor. Any type of calibration procedure can be performed in block 1105, with the type of calibration procedure varying from implementation to implementation.

Next, one or more sensitivity difference values (corresponding to the sensitivity difference) are provided to control logic of the given camera (block 1110). In one implementation, the sensitivity difference value(s) are specified and provided as one or more values in a single-precision floating point format. In another implementation, the sensitivity difference value(s) are specified and provided as one or more values in a double-precision floating point format. In other implementations, the sensitivity difference value(s) are provided as value(s) in any of various other types of formats. In one implementation, the sensitivity difference can be stored in a memory device of the given camera, with the memory device accessible by the control logic. In another implementation, the sensitivity difference is provided to the control logic by software during run-time. Then, the control logic applies the sensitivity difference value(s) to one or more captured half-pixel values to generate a representative full-pixel value (block 1115).

In one implementation, the control logic multiplies a sensitivity difference value by each captured half-pixel value in block 1115. In this implementation, the sensitivity difference value is a single value. In another implementation, there are multiple sensitivity difference values, one for each range of half-pixel values. For example, in one implementation, if the half-pixel value is in the range of 401 to 500, then apply a first sensitivity difference value. If the half-pixel value is in the range of 501 to 600, then apply a second sensitivity difference value, if the half-pixel value is in the range of 601 to 700, then apply a third sensitivity difference value, and so on. The number and size of ranges and the number of sensitivity difference values can vary according to the implementation. In a further implementation, the sensitivity difference is specified as a formula such as Y=A*x+b, where Y is the representative full-pixel value, x is the half-pixel value, and A and b are constants provided to the control logic. In other implementations, the sensitivity difference value(s) can be applied to the one or more captured half-pixel values in other suitable manners. It is noted that block 1115 can be performed any number of times by the control logic using the sensitivity difference generated by the calibration procedure. In some cases, the sensitivity difference can be periodically updated and recalibrated by a new calibration procedure. After block 1115, method 1100 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an interface; and
   control logic configured to:
   receive, via the interface, one or more half-pixel values captured by one or more half-shield phase detection auto-focus (PDAF) sensors for a first image;
   calculate a representative full-pixel value from the one or more half-pixel values;
   generate an estimate of an over-exposure of the first image based on the representative full-pixel value; and
   cause an adjustment to be made to one or more exposure settings used for capturing a second image, wherein the adjustment is determined based on the estimate of the over-exposure of the first image.

2. The apparatus as recited in claim 1, wherein the control logic is further configured to cause the adjustment to be made to one or more exposure settings to reduce a luminance of the second image by a given amount.

3. The apparatus as recited in claim 1, wherein the representative full-pixel value is calculated as a sum of a half-left pixel value and a half-right pixel value from a single half-shield PDAF pixel pair.

4. The apparatus as recited in claim 1, wherein the representative full-pixel value is calculated as double an average of a plurality of half-pixel values.

5. The apparatus as recited in claim 4, wherein the plurality of half-pixel values are selected from an oversaturated region of the first image.

6. The apparatus as recited in claim 1, wherein a magnitude of the adjustment is calculated based on a difference between the representative full-pixel value and a maximum pixel intensity value, and wherein the control logic is configured to compare the difference to one or more thresholds to determine how much to adjust an exposure value used for capturing the second image.

7. The apparatus as recited in claim 1, wherein the control logic is further configured to:
   receive a sensitivity difference value which specifies a difference between values captured by a half-shield PDAF sensor and a regular unshielded pixel sensor, wherein the sensitivity difference value is calculated during a calibration process; and
   apply the sensitivity difference value to the one or more one or more half-pixel values to generate the representative full-pixel value.

8. A system comprising:
   one or more half-shield phase detection auto-focus (PDAF) sensors; and
   control logic configured to:
   receive one or more half-pixel values captured by the one or more half-shield PDAF sensors for a first image;
   calculate a representative full-pixel value from the one or more half-pixel values;
   generate an estimate of an over-exposure of the first image based on the representative full-pixel value; and
   cause an adjustment to be made to one or more exposure settings used for capturing a second image, wherein the adjustment is determined based on the estimate of the over-exposure of the first image.

9. The system as recited in claim 8, wherein the control logic is further configured to cause the adjustment to be made to one or more exposure settings used for capturing the second image to reduce a luminance of the second image by a given amount.

10. The system as recited in claim 8, wherein the representative full-pixel value is calculated as a sum of a half-left pixel value and a half-right pixel value from a single half-shield PDAF pixel pair.

11. The system as recited in claim 8, wherein the representative full-pixel value is calculated as double an average of a plurality of half-pixel values.

12. The system as recited in claim 11, wherein the plurality of half-pixel values are selected from an oversaturated region of the first image.

13. The system as recited in claim 8, wherein a magnitude of the adjustment is calculated based on a difference between the representative full-pixel value and a maximum pixel intensity value, and wherein the control logic is configured to compare the difference to one or more thresholds to determine how much to adjust an exposure value used for capturing the second image.

14. The system as recited in claim 8, wherein the control logic is further configured to:
   receive a sensitivity difference value which specifies a difference between values captured by a half-shield PDAF sensor and a regular unshielded pixel sensor, wherein the sensitivity difference value is calculated during a calibration process; and apply the sensitivity difference value to the one or more one or more half-pixel values to generate the representative full-pixel value.

15. A method comprising:

receiving one or more half-pixel values captured by one or more half-shield phase detection auto-focus (PDAF) sensors for a first image;

calculating a representative full-pixel value from the one or more half-pixel values;

generating an estimate of an over-exposure of the first image based on the representative full-pixel value; and causing an adjustment to be made to one or more exposure settings used for capturing a second image, wherein the adjustment is determined based on the estimate of the over-exposure of the first image.

16. The method as recited in claim 15, cause the adjustment to be made to one or more exposure settings reduce a luminance of the second image by a given amount.

17. The method as recited in claim 15, wherein the representative full-pixel value is calculated as a sum of a half-left pixel value and a half-right pixel value from a single half-shield PDAF pixel pair.

18. The method as recited in claim 15, wherein the representative full-pixel value is calculated as double an average of a plurality of half-pixel values.

19. The method as recited in claim 18, wherein the plurality of half-pixel values are selected from an oversaturated region of the first image.

20. The method as recited in claim 15, wherein a magnitude of the adjustment is calculated based on a difference between the representative full-pixel value and a maximum pixel intensity value.

* * * * *